US012507996B2

(12) United States Patent
Annangi et al.

(10) Patent No.: US 12,507,996 B2
(45) Date of Patent: Dec. 30, 2025

(54) ULTRASOUND IMAGING SYSTEM AND METHOD FOR SEGMENTING AN OBJECT FROM A VOLUMETRIC ULTRASOUND DATASET

(71) Applicant: GE Precision Healthcare LLC, Wauwatosa, WI (US)

(72) Inventors: Pavan Annangi, Bangalore (IN); Deepa Anand, Bangalore (IN); Stephan Anzengruber, Ried im Innkreis (AT); Bhushan D. Patil, Pune (IN); Arathi Sreekumari, Bangalore (IN)

(73) Assignee: GE Precision Healthcare LLC, Wauwatosa, WI (US)

( * ) Notice: Subject to any disclaimer, the term of this patent is extended or adjusted under 35 U.S.C. 154(b) by 395 days.

(21) Appl. No.: 18/175,307

(22) Filed: Feb. 27, 2023

(65) Prior Publication Data

US 2024/0285256 A1 Aug. 29, 2024

(51) Int. Cl.
*A61B 8/00* (2006.01)

(52) U.S. Cl.
CPC ............. *A61B 8/483* (2013.01); *A61B 8/466* (2013.01); *G06T 2207/20084* (2013.01)

(58) Field of Classification Search
CPC .................... A61B 8/483; A61B 8/466; G06T 2207/20084
See application file for complete search history.

(56) References Cited

U.S. PATENT DOCUMENTS

| 6,778,690 B1 * | 8/2004 | Ladak | G06T 7/12 |
| | | | 600/443 |
| 11,534,136 B2 | 12/2022 | Funka-Lea | |
| 2008/0051653 A1 * | 2/2008 | Choi | A61B 8/08 |
| | | | 600/437 |
| 2011/0150274 A1 * | 6/2011 | Patwardhan | G06T 7/149 |
| | | | 382/209 |

(Continued)

OTHER PUBLICATIONS

Mozaffari, M., et al. "3D Ultrasound image segmentation: A Survey," arXiv e-prints. 2016. p. 1-18 (Year: 2016).*

(Continued)

*Primary Examiner* — Sean A Frith

(57) ABSTRACT

Various methods and ultrasound imaging systems are provided for segmenting an object. In one example, a method includes accessing a volumetric ultrasound dataset, receiving an identification of a seed point for an object in an image generated based on the volumetric ultrasound dataset, and implementing a two-dimensional segmentation model on a first plurality of parallel slices based on the seed point to generate a first plurality of segmented regions. The method includes implementing the two-dimensional segmentation model on a second plurality of parallel slices based on the seed point to generate a second plurality of segmented regions. The method includes generating a detected region by accumulating the first plurality of segmented regions and the second plurality of segmented regions. The method includes implementing a shape completion model to generate a three-dimensional shape model for the object, and displaying rendering of the object based on the three-dimensional shape model.

20 Claims, 11 Drawing Sheets

(56) References Cited

U.S. PATENT DOCUMENTS

| | | | | |
|---|---|---|---|---|
| 2012/0071758 | A1* | 3/2012 | Lachaine | A61B 8/085 |
| | | | | 600/443 |
| 2012/0263368 | A1* | 10/2012 | Nakano | G16H 50/30 |
| | | | | 382/133 |
| 2022/0330914 | A1* | 10/2022 | Chen | A61B 8/5215 |
| 2022/0370033 | A1* | 11/2022 | Klingensmith | A61B 34/10 |
| 2023/0293153 | A1* | 9/2023 | Cox | A61B 8/466 |
| | | | | 600/443 |

OTHER PUBLICATIONS

Wang, X., et al. "Carotid Artery Segmentation in 3D ultrasound images using a hybrid framework," Proceedings of the IEEE International Conference on Information and Automation Shenyang, China, Jun. 2012. p. 698-703 (Year: 2012).*

Ni et al., "Segmentation of uterine fibroid ultrasound images using a dynamic statistical shape model in HIFU therapy", Computerized Medical Imaging and Graphics, vol. 46, Part 3, 2015, pp. 302-314, 13 pages.

Xu et al., "A Split-and-Merge-Based Uterine Fibroid Ultrasound Image Segmentation Method in HIFU Therapy", (2015), PLOS One 10(5): e0125738, https://doi.org/10.1371/journal.pone.0125738, 24 pages.

Dilna et al., "Fibroid Segmentation in Ultrasound Uterus Images Using Wavelet Filter and Active Contour Model," (2021). Data Analytics and Management. Lecture Notes on Data Engineering and Communications Technologies, vol. 54. Springer, Singapore, 9 pages.

\* cited by examiner

ULTRASOUND IMAGING SYSTEM AND METHOD FOR SEGMENTING AN OBJECT FROM A VOLUMETRIC ULTRASOUND DATASET

FIELD OF THE INVENTION

This disclosure relates generally to an ultrasound imaging system and a method for segmenting an object from a volumetric ultrasound dataset using both a two-dimensional segmentation model and a shape completion model.

BACKGROUND OF THE INVENTION

Segmenting objects from volumetric ultrasound datasets can be challenging using conventional techniques and ultrasound imaging systems, particularly when the object in question lacks clearly defined boundaries. One example of an object that is difficult to segment is a fibroid. Fibroids are non-malignant lesions that have high occurrence rates in women across a wide range of ages. When imaged with an ultrasound imaging system, fibroids typically lack clearly defined boundaries. Additionally, it is common for fibroids to be positioned in clusters without clear demarcations between adjacent fibroids. For these and other reasons, it is difficult to segment fibroids from volumetric ultrasound datasets using conventional techniques. If untreated, fibroids may cause physical discomfort and/or infertility. With respect to fibroids, the care pathway used to treat a fibroid is based on the location and size of the fibroid in question.

Conventional solutions struggle to accurately segment objects without clearly defined boundaries, such as fibroids. Since the shape of a fibroid is not known a priori, conventional segmentation techniques tend to be inaccurate at segmenting fibroids or they take too long to be clinically useful. Since the location and size of the fibroid are both critical parameters for determining the care pathway that is used, there is a need for an improved ultrasound imaging system and method for segmenting an object from a volumetric ultrasound dataset.

BRIEF DESCRIPTION OF THE INVENTION

The above-mentioned shortcomings, disadvantages and problems are addressed herein which will be understood by reading and understanding the following specification. In an embodiment, a method of ultrasound imaging includes accessing a volumetric ultrasound dataset. The method includes generating an image based on the volumetric ultrasound dataset. The method includes identifying a seed point for an object based on the image. The method includes automatically implementing a two-dimensional segmentation model on a first plurality of parallel slices based on the seed point to generate a first plurality of segmented regions, wherein the first plurality of parallel slices is generated based on the volumetric ultrasound dataset. The method includes automatically implementing the two-dimensional segmentation model on a second plurality of parallel slices based on the seed point to generate a second plurality of segmented regions, wherein second plurality of slices is generated based on the volumetric ultrasound dataset, and wherein the second plurality of parallel slices is not parallel to the first plurality of parallel slices. The method includes automatically generating a detected region by accumulating the first plurality of segmented regions and the second plurality of segmented regions, wherein the detected region represents less than all of the object. The method includes automatically implementing a shape completion model on the detected region in order to generate a three-dimensional shape model for the object. The method includes generating a rendering of the object based on the three-dimensional shape model and displaying the rendering of the object on a display device.

In an embodiment, an ultrasound imaging system includes an ultrasound probe, a user interface, a display device, and a processor in electronic communication with the ultrasound probe, the user interface and the display device. The processor is configured to access a volumetric ultrasound dataset and generate an image based on the volumetric ultrasound dataset. The processor is configured to receive either an identification of a seed point or identify a seed point, wherein the seed point is for an object based on the image. The processor is configured to automatically implement a two-dimensional segmentation model on a first plurality of parallel slices based on the seed point to generate a first plurality of segmented regions, wherein the first plurality of parallel slices is generated based on the volumetric ultrasound dataset. The processor is configured to automatically implement the two-dimensional segmentation model on a second plurality of parallel slices based on the seed point to generate a second plurality of segmented regions, wherein the second plurality of parallel slices is generated based on the volumetric ultrasound dataset, and wherein the second plurality of parallel slices is not parallel to the first plurality of parallel slices. The processor is configured to automatically implement a shape completion model on the detected region in order to generate a three-dimensional shape model for the object. The processor is configured to generate a rendering of the object based on the three-dimensional shape model. The processor is configured to display the rendering of the object on the display device.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized, and that logical, mechanical, electrical and other changes may be made without departing from the scope of the embodiments. The following detailed description is, therefore, not to be taken as limiting the scope of the invention.

Figure 1:
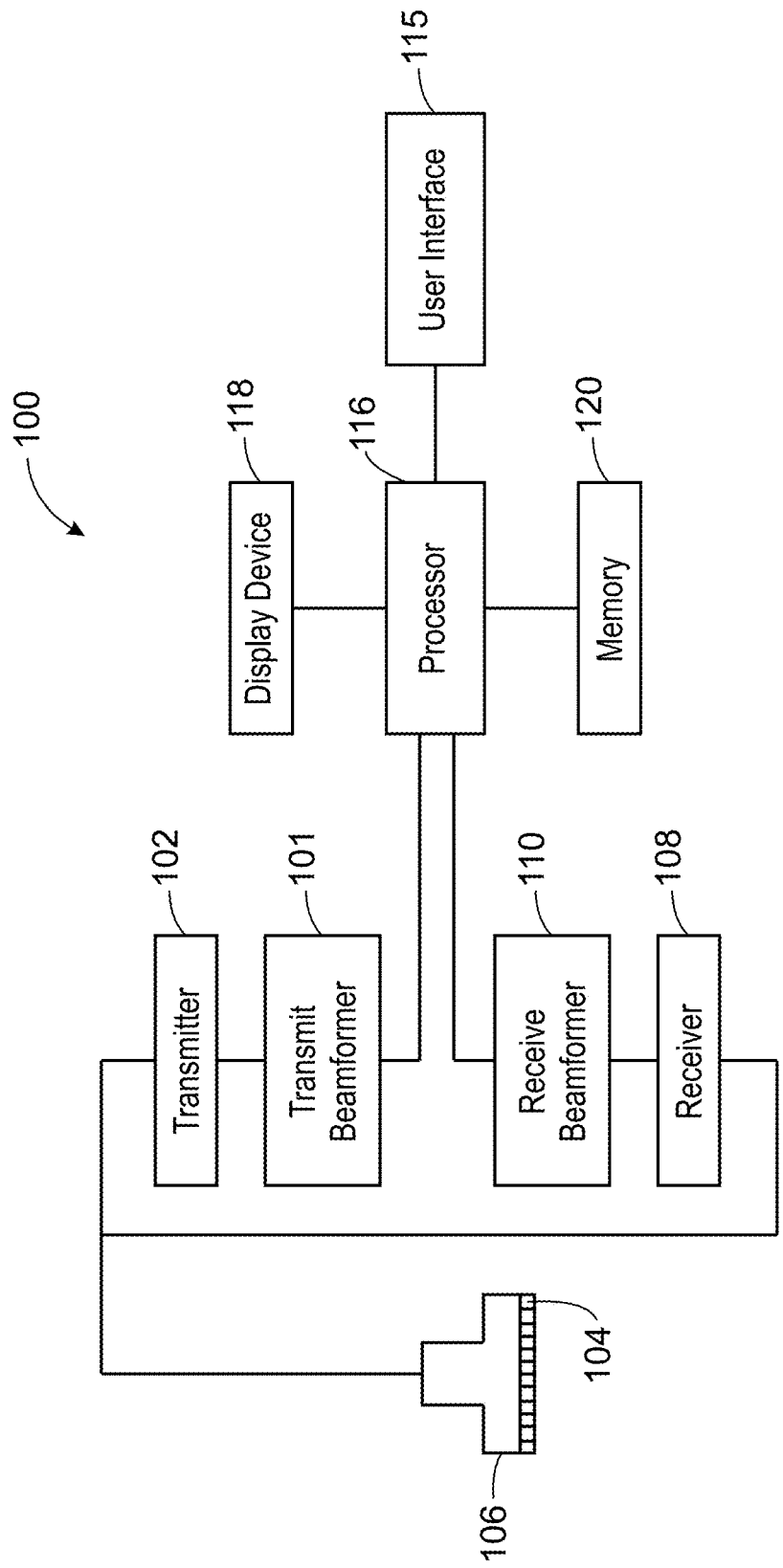
FIG. 1 is a schematic diagram of an ultrasound imaging system in accordance with an embodiment.

FIG. 1 is a schematic diagram of an ultrasound imaging system 100 in accordance with an embodiment. The ultrasound imaging system 100 includes a transmit beamformer 101 and a transmitter 102 that drive elements 104 within an ultrasound probe 106 to emit pulsed ultrasonic signals into a body (not shown) through one or more transmit events. The ultrasound probe 106 may be any type of ultrasound probe that may be used to acquire a three-dimensional ultrasound dataset. The ultrasound probe 106 may, for instance be a two-dimensional probe that is configured to acquire three-dimensional ultrasound data through one or both of sweeping or rotating the ultrasound probe 106. The ultrasound probe 106 may be a mechanical 3D probe. The ultrasound probe may be an e4D probe (i.e., a two-dimensional matrix array probe). The ultrasound probe 106 may be any other type of ultrasound probe that may be used to acquired three-dimensional ultrasound data according to various embodiments. Still referring to FIG. 1, the pulsed ultrasonic signals are back-scattered from structures in the body, like blood cells or muscular tissue, to produce echoes that return to the elements 104. The echoes are converted into electrical signals by the elements 104 and the electrical signals are received by a receiver 108. The electrical signals representing the received echoes are passed through a receive beamformer 110 that outputs ultrasound data. According to some embodiments, the probe 106 may contain electronic circuitry to do all or part of the transmit beamforming and/or the receive beamforming. For example, all or part of the transmit beamformer 101, the transmitter 102, the receiver 108 and the receive beamformer 110 may be situated within the ultrasound probe 106. The terms "scan" or "scanning" may also be used in this disclosure to refer to acquiring data through the process of transmitting and receiving ultrasonic signals. The terms "data" and "ultrasound data" may be used in this disclosure to refer to either one or more datasets acquired with an ultrasound imaging system. A user interface 115 may be used to control operation of the ultrasound imaging system 100. The user interface 115 may be used to control the input of patient data, or to select various modes, operations, parameters, and the like. The user interface 115 may include one or more user input devices such as a keyboard, hard keys, a touch pad, a touch screen, a track ball, rotary controls, sliders, soft keys, or any other user input devices.

The ultrasound imaging system 100 also includes a processor 116 to control the transmit beamformer 101, the transmitter 102, the receiver 108 and the receive beamformer 110. The user interface 115 is in electronic communication with the processor 116. The processor 116 may include one or more central processing units (CPUs), one or more microprocessors, one or more microcontrollers, one or more graphics processing units (GPUs), one or more digital signal processors (DSPs), and the like. According to some embodiments, the processor 116 may include one or more GPUs, where some or all of the one or more GPUs include a tensor processing unit (TPU). According to embodiments, the processor 116 may include a field-programmable gate array (FPGA), or any other type of hardware capable of carrying out processing functions. The processor 116 may be an integrated component or it may be distributed across various locations. For example, according to an embodiment, processing functions associated with the processor 116 may be split between two or more processors based on the type of operation. For example, embodiments may include a first processor configured to perform a first set of operations and a second, separate processor to perform a second set of operations. According to embodiments, the processor 116 may be configured to implement a neural network. The processor 116 may be configured to execute instructions accessed from a memory. According to an embodiment, the processor 116 is in electronic communication with the ultrasound probe 106, the receiver 108, the receive beamformer 110, the transmit beamformer 101, and the transmitter 102. For purposes of this disclosure, the term "electronic communication" may be defined to include both wired and wireless connections. The processor 116 may control the ultrasound probe 106 to acquire ultrasound data. The processor 116 controls which of the elements 104 are active and the shape of a beam emitted from the ultrasound probe 106. The processor 116 is also in electronic communication with a display device 118, and the processor 116 may process the ultrasound data into image frames for display on the display device 118. According to embodiments, the processor 116 may also include a complex demodulator (not shown) that demodulates the RF data and generates raw data. In another embodiment, the demodulation may be carried out earlier in the processing chain. The processor 116 may be adapted to perform one or more processing operations according to a plurality of selectable ultrasound modalities on the data. The data may be processed in real-time during a scanning session as the echo signals are received. The processor 116 may be configured to scan-convert the ultrasound data acquired with the ultrasound probe 106 so it may be displayed on the display device 118 as one or more image frames. Displaying ultrasound data in real-time may involve displaying image frames based on the ultrasound data without any intentional delay. For example, the processor 116 may display each updated image frame as soon as each updated image frame of ultrasound data has been acquired and processed for display during the process of an ultrasound procedure. Real-time frame rates may vary based on the size of the region or volume from which data is acquired and the specific parameters used during the acquisition. According to other embodiments, the data may be stored temporarily in a buffer (not shown) during a scanning session and processed in less than real-time. According to embodiments that include a software beamformer, the functions associated with the transmit beamformer 101 and/or the receive beamformer 108 may be performed by the processor 116.

According to various embodiments, the components illustrated in FIG. 1 may be part of a distributed ultrasound imaging system. For example, one or more of the processor 116, the user interface 115, the transmitter 102, the transmit beamformer 101, the receive beamformer 110, the receiver 108, a memory 120, and the display device 118 may be located remotely from the ultrasound probe 106. The aforementioned components may be located in different rooms or different facilities according to various embodiments. For example, the probe 106 may be used to acquire ultrasound data from the patient and then transmit the ultrasound data, via either wired or wireless techniques, to the processor 116.

According to an embodiment, the ultrasound imaging system 100 may continuously acquire ultrasound data at a frame rate of, for example, 20 Hz to 80 Hz. Image frames generated from the ultrasound data may be refreshed at similar frame rates. Other embodiments may acquire data and display images at different rates. For example, some embodiments may acquire ultrasound data at a volume rate of less than 20 Hz or greater than 80 Hz depending on the size of the ultrasound data within each image frame and the parameters associated with the specific application. The memory 120 is included for storing processed image frames. In an exemplary embodiment, the memory 120 is of sufficient capacity to store image frames of ultrasound data acquired over a period of time at least several seconds in length. The image frames may be stored in a manner to facilitate retrieval thereof according to its order or time of acquisition. The memory 120 may comprise any known data storage medium.

In various embodiments of the present invention, data may be processed by other or different mode-related modules by the processor 116 (e.g., B-mode, color flow Doppler, M-mode, color M-mode, spectral Doppler, Elastography, TVI, strain, strain rate, and the like) to form two-dimensional ultrasound data or three-dimensional ultrasound data. For example, one or more modules may generate B-mode, color Doppler, M-mode, color M-mode, spectral Doppler, Elastography, TVI, strain, strain rate and combinations thereof, and the like. The image beams and/or images are stored, and timing information indicating a time at which the data was acquired in memory may be recorded. The modules may include, for example, a scan conversion module to perform scan conversion operations to convert the ultrasound data for each image frame from beam space coordinates to display space coordinates. A video processor module may be provided that reads the image frames from a memory, such as the memory 120, and displays the image frames in real-time while a procedure is being carried out on a patient. The video processor module may store the image frames in an image memory, from which the image frames are read and displayed.

Figure 2:
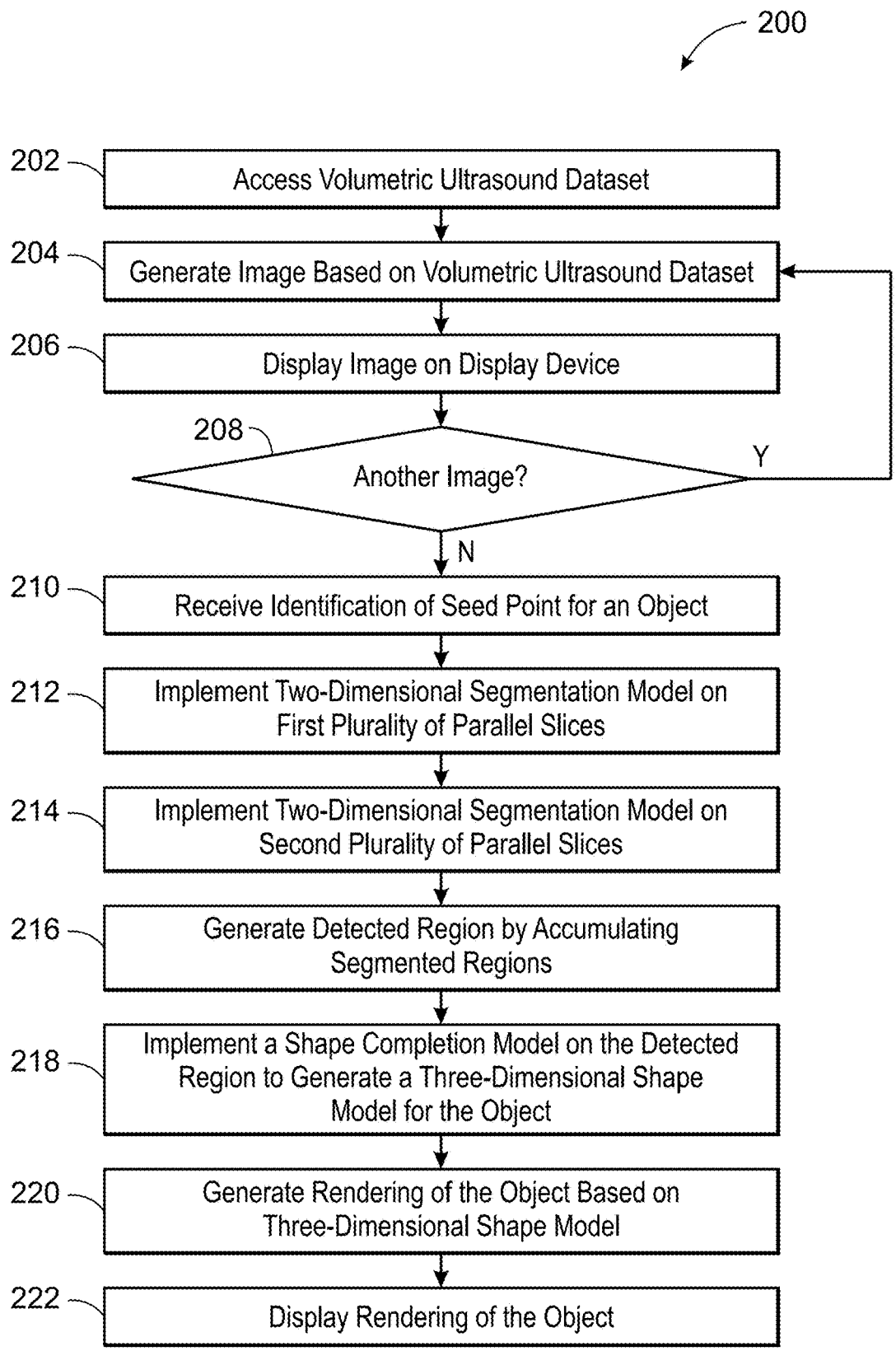
FIG. 2 is a flow chart of a method in accordance with an exemplary embodiment.

FIG. 2 is a flow chart of a method 200 in accordance with an exemplary embodiment. The individual blocks of the flow chart represent steps that may be performed in accordance with the method 200. Additional embodiments may perform the steps shown in a different sequence and/or additional embodiments may include additional steps not shown in FIG. 2. The technical effect of the method 200 is the segmenting of an object and the displaying of a rendering of the object on a display device. The method 200 may be performed with the ultrasound imaging system 100 shown in FIG. 1. The method 200 will be described in detail hereinafter.

At step 202 of the method 200, the processor 116 accesses a volumetric ultrasound dataset. The volumetric ultrasound dataset may be accessed in real-time from the ultrasound probe 106 as it is acquired. Or, according to other embodiments, the volumetric ultrasound dataset may be accessed from a storage or a memory. For example, the volumetric ultrasound dataset have been previously acquired and the processor 116 may access the volumetric ultrasound dataset from memory or storage located on the ultrasound imaging system, such as the memory 120, or the processor 116 may access the volumetric ultrasound dataset from a remote memory or a remote storage location. For example, the processor 116 may access the volumetric ultrasound dataset from a different ultrasound imaging system, from a remote server, from a Picture Archiving and Communications System (PACS), or from any other remote location.

At step 204, the processor 116 generates an image based on the volumetric ultrasound dataset. The image may be rendered based on the volumetric ultrasound dataset. For example, the image may be a volume rendering or a rendering of a slice. According to some embodiments, the image may be a rendering of a slice, such as an A-plane slice, a B-plane slice, a C-plane slice or a slice of any arbitrary orientation with respect to ultrasound probe 106. According to an exemplary embodiment, the image may be an A-plane slice, as A-plane slices typically represent the highest resolution possible when the image is a rendering of a slice generated from the volumetric ultrasound data.

Figure 3:
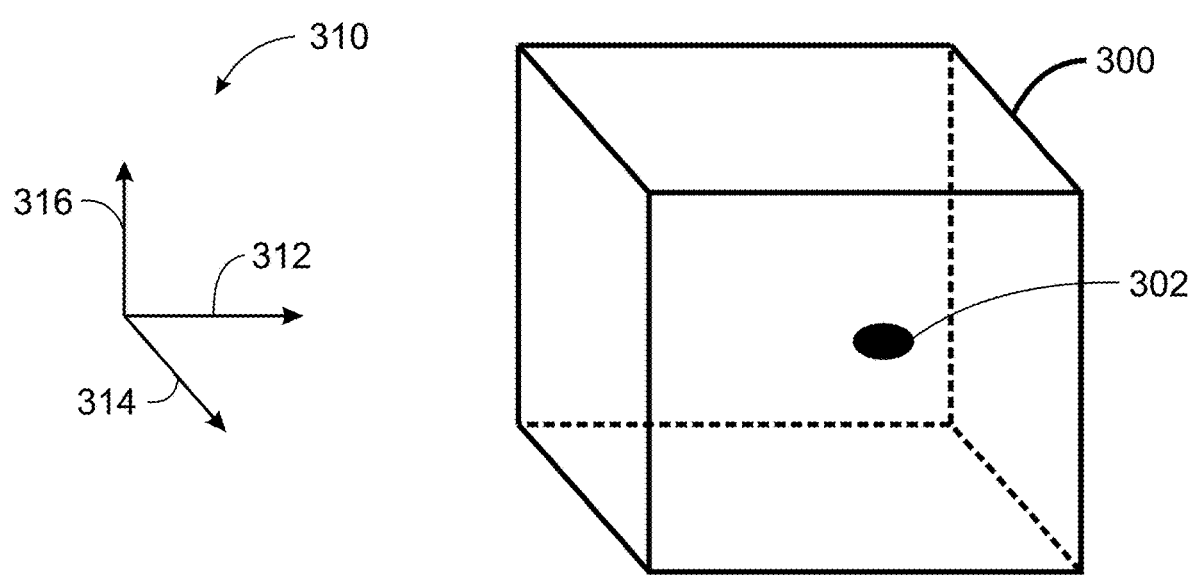
FIG. 3 is a schematic representation of a volume-of-interest represented by the volumetric ultrasound data in accordance with an exemplary embodiment.

FIG. 3 is a schematic representation of a volume-of-interest 300 represented by the volumetric ultrasound data. The volume-of-interest 300 is a cube according to the embodiment shown in FIG. 3, but it should be appreciated that the volume-of-interest may be any other three-dimensional shape according to various embodiments. An object 302 is shown with respect to the volume-of-interest 300. The object 302 may be a fibroid according to an exemplary embodiment. According to other embodiments, the object 302 may be a different type of structure, such as a nodule, a mass, a calcification, a tumor, or any other type of structure.

A coordinate axis 310 is shown with respect to the volume-of-interest 300 in accordance with an embodiment. The coordinate axis 310 includes a first axis 312, a second axis 314, and a third axis 316. The first axis 312 represents an azimuth direction, the second axis 314 represents an elevation direction, and the third axis 316 represents a depth direction. While shown with respect to the volume-of-interest 300, the azimuth direction, the elevation direction and the depth direction are defined with respect to the position of the ultrasound probe 106 (not shown in FIG. 3, FIG. 4, FIG. 5 or FIG. 6) used to acquire the volumetric ultrasound dataset representing the volume-of-interest. The azimuth direction, the elevation direction and the depth direction are well-known to those skilled in the art and will therefore not be described in additional detail.

Figure 4:
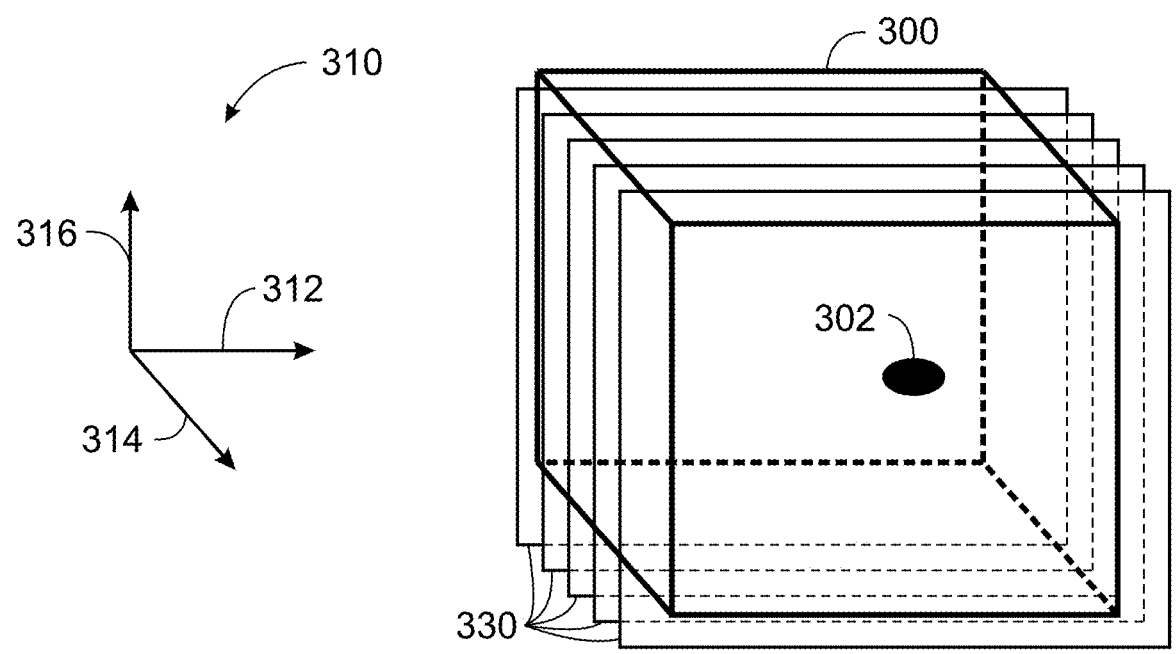
FIG. 4 is a schematic representation of a plurality of A-plane slices shown with respect to the volume-of-interest in accordance with an embodiment.

FIG. 4 is a schematic representation of a plurality of A-plane slices 330 shown with respect to the volume-of-interest 300 in accordance with an embodiment. Each of the plurality of A-plane slices 330 is perpendicular to the second axis 314, which represents the elevation direction.

Figure 5:
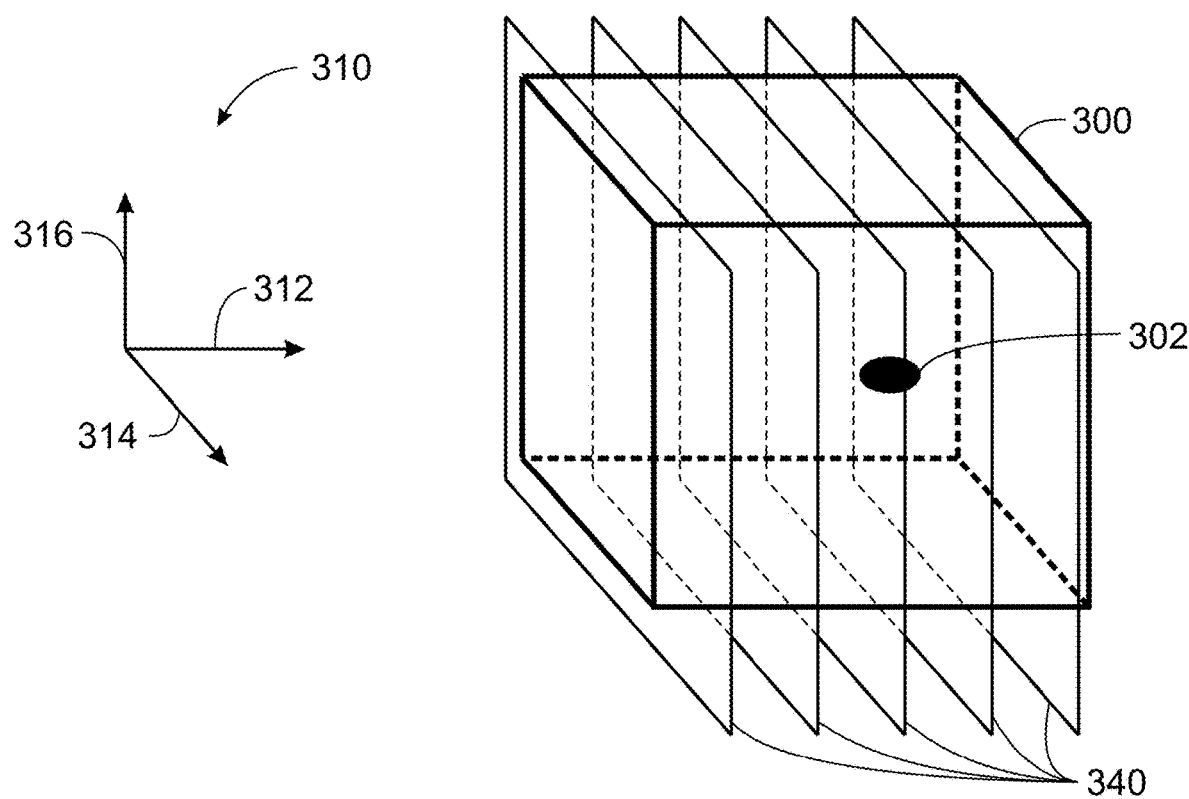
FIG. 5 is a schematic representation of a plurality of B-plane slices shown with respect to the volume-of-interest in accordance with an embodiment.

FIG. 5 is a schematic representation of a plurality of B-plane slices 340 shown with respect to the volume-of-interest 300 in accordance with an embodiment. Each of the plurality of B-plane slices 340 is perpendicular to the first axis 312, which represents the azimuth direction.

Figure 6:
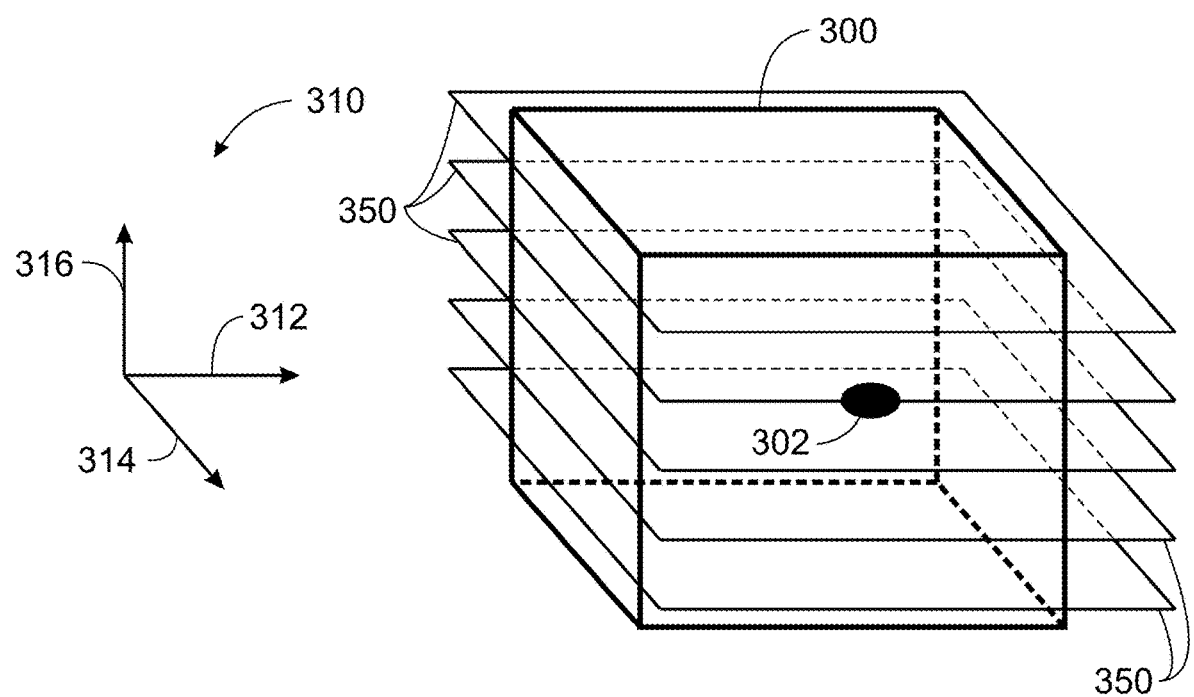
FIG. 6 is schematic representation of a plurality of C-plane slices shown with respect to the volume-of-interest in accordance with an embodiment.

FIG. 6 is schematic representation of a plurality of C-plane slices 350 shown with respect to the volume-of-interest in accordance with an embodiment. Each of the plurality of C-plane slices 350 is perpendicular to a third axis 316, which represents the depth direction.

At step 206, the processor 116 displays the image generated at step 204 on the display device 118. If the image is a volume rendering, the user may have the ability to rotate the volume rendering in order to view it from different directions. If the image is a rendering of a slice, the processor 116 may display the rendering of the slice as a two-dimensional image on the display device 118. If the image is a rendering of a slice, the image may be an A-plane slice, a B-plane slice, a C-plane slice, or a slice representing an arbitrary plane (not shown) according to various embodiments.

At step 208, the processor 116 determines if it is desired to display another image generated based on the volumetric ultrasound dataset on the display device 118. For example, according to an exemplary embodiment, the user may desire to view a series of different images, each image representing a rendering of a slice from a different location. If it is desired to view an additional image at step 208, the method 200 returns to step 204. Step 204, step 206, and step 208 may be repeated as many times as is desired by the user according to various embodiments. According to an exemplary embodiment, the user may advance through a series of parallel slices generated from the volumetric ultrasound dataset. This would entail repeating steps 204, 206, and 208 a plurality of times until all of the desired images representing various slices have been generated and displayed.

At step 210, the processor 116 receives identification of a seed point for an object. According to an embodiment, the processor 116 may receive an input through the user interface 115 identifying a location of a seed point. The user may, for instance, use the user interface 115 in order to indicate the location of a seed point in one of the images displayed at step 208. According to various embodiments, the processor 116 may receive the identification of multiple seed points at step 210 if the user would like to identify multiple seed point locations. Or, according to various embodiments, multiple seed points may be identified during the course of performing multiple iterations of steps 204, 206, and 208.

At step 212, the processor 116 implements a two-dimensional segmentation model on a first plurality of parallel slices. According to an embodiment, the first plurality of parallel slices may be plurality of A-plane slices, such as the plurality of A-plane slices 330 shown in FIG. 4. Or the first plurality of parallel slices may parallel to a plane of any arbitrary orientation. The processor 116 may be configured to start from a slice in which the seed point was identified. The processor 116 may then also implement the two-dimensional segmentation model on a plurality of slices that are parallel to the slice in which the seed point was identified. According to an embodiment, the plurality of slices may be adjacent to the slice in which the seed point was identified. The processor 116 may be configured to implement the two-dimensional segmentation model on a fixed number of parallel slices from the slice in which the seed point was identified. For example, The processor 116 may be configured to implement the segmentation model by implementing a trained deep learning algorithm, such as a neural network. Additional information about an exemplary neural network will be discussed hereinafter. The processor 116 may implement the two-dimensional segmentation model on 5 or more parallel slices according to an embodiment. According to another embodiment, the processor 116 may implement the two-dimensional segmentation model on 10 or more parallel slices according to an embodiment. According to an exemplary embodiment, the processor 116 may implement the two-dimensional segmentation model on between 5 and 20 parallel slices. According to another exemplary embodiment, the processor 116 may implement the two-dimensional segmentation model on between 10 and 30 parallel slices. According to an exemplary embodiment, the processor 116 may be configured to implement the two-dimensional segmentation model on parallel slices on both sides of the slice in which the seed point was identified. After implementing the segmentation model on the first plurality of parallel slices, the processor 116 generates a first plurality of segmented regions.

According to various embodiments, the processor 116 may be configured to perform a first down-selecting step after implementing the two-dimensional segmentation model on one or more of the first plurality of parallel slices. The first down-selecting step is so named because it results in a smaller number of potential regions of interest than originally identified by the implementing the two-dimensional segmentation model on one or more of the first plurality of parallel slices. For example, implementing the two-dimensional segmentation algorithm may result in the identification of two or more potential regions of interest within each of the first plurality of parallel slices. Some of these potential regions of interest may not correspond to the desired object or objects. In cases where the implementation of the two-dimensional segmentation algorithm results in one or more potential regions of interest (i.e., segmentation areas), the processor 116 may be configured to implement the first down-selection step in order to reduce the number of identified segmented regions in each of the first plurality of parallel slices with potential regions of interest that do not correspond to the desired object/s. For example, according to an embodiment, the processor 116 may be configured to only keep potential regions of interest (i.e., segmentation areas) that correspond to the same three-dimensional object associated with the seed point. In other words, the processor 116 may be configured to only keep areas identified using the two-dimensional segmentation model corresponding to the same three-dimensional object within which the seed point is located. Any segmentation areas or potential regions of interest identified by implementing the two-dimensional segmentation model that are not associated with the three-dimensional object where the seed point is located may be removed during the first down-selecting step.

According to other embodiments, the processor 116 may be configured to receive an identification of a seed point for the objection in an image, and then the processor 116 may implement the two-dimensional segmentation model on the first plurality of parallel slice. The two-dimensional segmentation model may initially identify two or more potential regions of interest in one or more of the first plurality of parallel slices. However, the processor 116 may be configured to apply the first down-selecting step after implementing the two-dimensional segmentation model in order to only keep the segmented regions associated with the same three-dimensional object where the seed point is located.

According to yet other embodiments, the two-dimensional segmentation algorithm may only identify a single potential region of interest (i.e. segmented area) in each of the first plurality of parallel slices. For embodiments where only one or zero potential regions of interest (i.e., segmented areas) are identified per slice, it will not be necessary to implement the down-selecting.

At step 214, the processor 116 implements a two-dimensional segmentation model on a second plurality of parallel slices. According to an embodiment, the second plurality of parallel slices may be plurality of B-plane slices, such as the plurality of B-plane slices 340 shown in FIG. 5. The processor 116 may be configured to start from a slice in which the seed point was identified. The processor 116 may then also implement the two-dimensional segmentation model on a plurality of slices that are parallel to the slice in which the seed point was identified. According to an embodiment, the plurality of slices may be adjacent slices. The processor 116 may be configured to implement the two-dimensional segmentation model on a fixed number of parallel slices from the slice in which the seed point was identified. For example, The processor 116 may be configured to implement a trained deep learning algorithm, such as a convolutional neural network. Additional information about an exemplary neural network that may be used to identify the two-dimensional segmentation model will be discussed hereinafter. The processor 116 may implement the two-dimensional segmentation model on 5 or more parallel slices according to an embodiment. According to another embodiment, the processor 116 may implement the two-dimensional segmentation model on 10 or more parallel slices according to an embodiment. According to an exemplary embodiment, the processor 116 may implement the two-dimensional segmentation model on between 5 and 20 parallel slices. According to another exemplary embodiment, the processor 116 may implement the two-dimensional segmentation model on between 10 and 30 parallel slices. According to an exemplary embodiment, the processor 116 may be configured to implement the two-dimensional segmentation model on parallel slices on both sides of the slice in which the seed point was identified.

According to various embodiments, the processor 116 may be configured to perform a second down-selecting step after implementing the two-dimensional segmentation model on one or more of the second plurality of parallel slices. For example, implementing the two-dimensional segmentation algorithm may result in the identification of two or more potential regions of interest within each of the second plurality of parallel slices. Some of these potential regions of interest may not correspond to the desired object or objects. In cases where the implementation of the two-dimensional segmentation algorithm results in one or more potential regions of interest (i.e., segmentation areas), the processor 116 may be configured to implement the second down-selection step in order to reduce the number of identified segmented regions in each of the second plurality of parallel slices with potential regions of interest that do not correspond to the desired object/s. For example, according to an embodiment, the processor 116 may be configured to only keep potential regions of interest (i.e., segmentation areas) that correspond to the same three-dimensional object associated with the seed point. In other words, the processor 116 may be configured to only keep areas identified using the two-dimensional segmentation model corresponding to the same three-dimensional object within which the seed point is located. Any segmentation areas or potential regions of interest identified by implementing the two-dimensional segmentation model that are not associated with the three-dimensional object where the seed point is located may be removed during the second down-selecting step.

According to other embodiments, the processor 116 may be configured to receive an identification of a seed point for the object in an image, and then the processor 116 may implement the two-dimensional segmentation model on the second plurality of parallel slice. The two-dimensional segmentation model may initially identify two or more potential regions of interest in one or more of the second plurality of parallel slices. However, the processor 116 may be configured to apply the second down-selecting step after implementing the two-dimensional segmentation model in order to only keep the segmented regions associated with the same three-dimensional object where the seed point is located.

According to yet other embodiments, the two-dimensional segmentation algorithm may only identify a single potential region of interest (i.e. segmented area) in each of the second plurality of parallel slices. For embodiments where only one or zero potential regions of interest (i.e., segmented areas) are identified per slice, it will not be necessary to implement the second down-selecting step.

Figure 7:
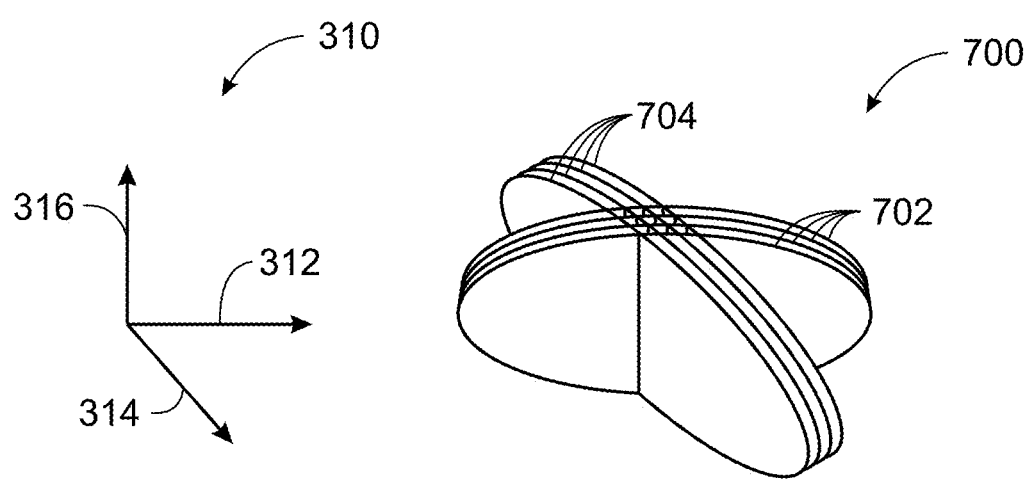
FIG. 7 is a schematic representation of a detected region according to an exemplary embodiment.

At step 216, the processor 116 accumulates the first plurality of segmented regions and the second plurality of segmented regions to generate a detected region 700. FIG. 7 is a schematic representation of a detected region 700 according to an exemplary embodiment. The detected region 700 includes a first plurality of detected regions 702 and a second plurality of detected regions 704. As described hereinabove, the first plurality of detected regions 702 represents the segmented regions identified in the first plurality of parallel slices, which were A-plane slices according to the previously described example. The second plurality of detected regions 704 represents the segmented regions identified in the second plurality of parallel slices, which were the B-plane slices according to the previously described example. The detected region 700 represents less than all of the object 302.

At step 218, the processor 118 implements a shape completion model based on the detected region 704. The shape completion model may be a trained deep learning algorithm, such as a neural network. For example, the shape completion model may be trained using data from partial segmentations from the object as input and the ground truth shape as output. According to an embodiment, the partial segmentations are obtained by accumulating segmentations/detections in planes, such as the A-planes, the B-planes, the C-planes, etc. The processor 116 generates a three-dimensional shape model for the object by implementing the shape completion model.

Next, at step 220, the processor generates a rendering of the object based on the three-dimensional shape model. The rendering may be a volume-rendering, a projection rendering, such as a maximum intensity projection (MIP) image or a minimum intensity projection (MinIP) image, a rendering of object along a cut plane, a rendering of the object that is two dimensional planar image of the object, or any other type of rendering generated based on the three-dimensional shape model. The rendering of the object may be displayed by itself or in combination with one or more other images/views.

Figure 8:
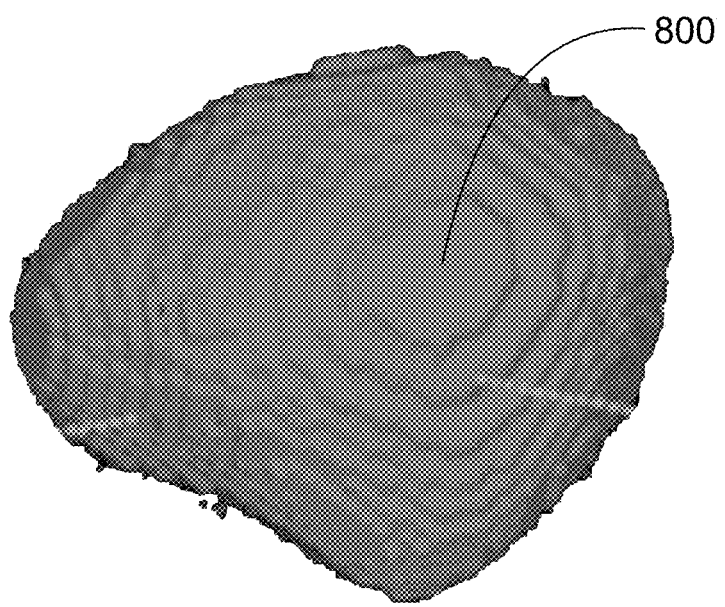
FIG. 8 is a schematic representation of a three-dimensional shape model for the object according to an exemplary embodiment.

At step 222, the processor 116 displays a rendering of the object based on the three-dimensional shape model. FIG. 8 is a schematic representation of a three-dimensional shape model 800 for the object according to an exemplary embodiment. The three-dimensional shape model 800 is determined by implementing the shape completion model, which is a representation of the object 302. According to an embodiment, the three-dimensional shape model 800 may represent a fibroid.

Figure 9:
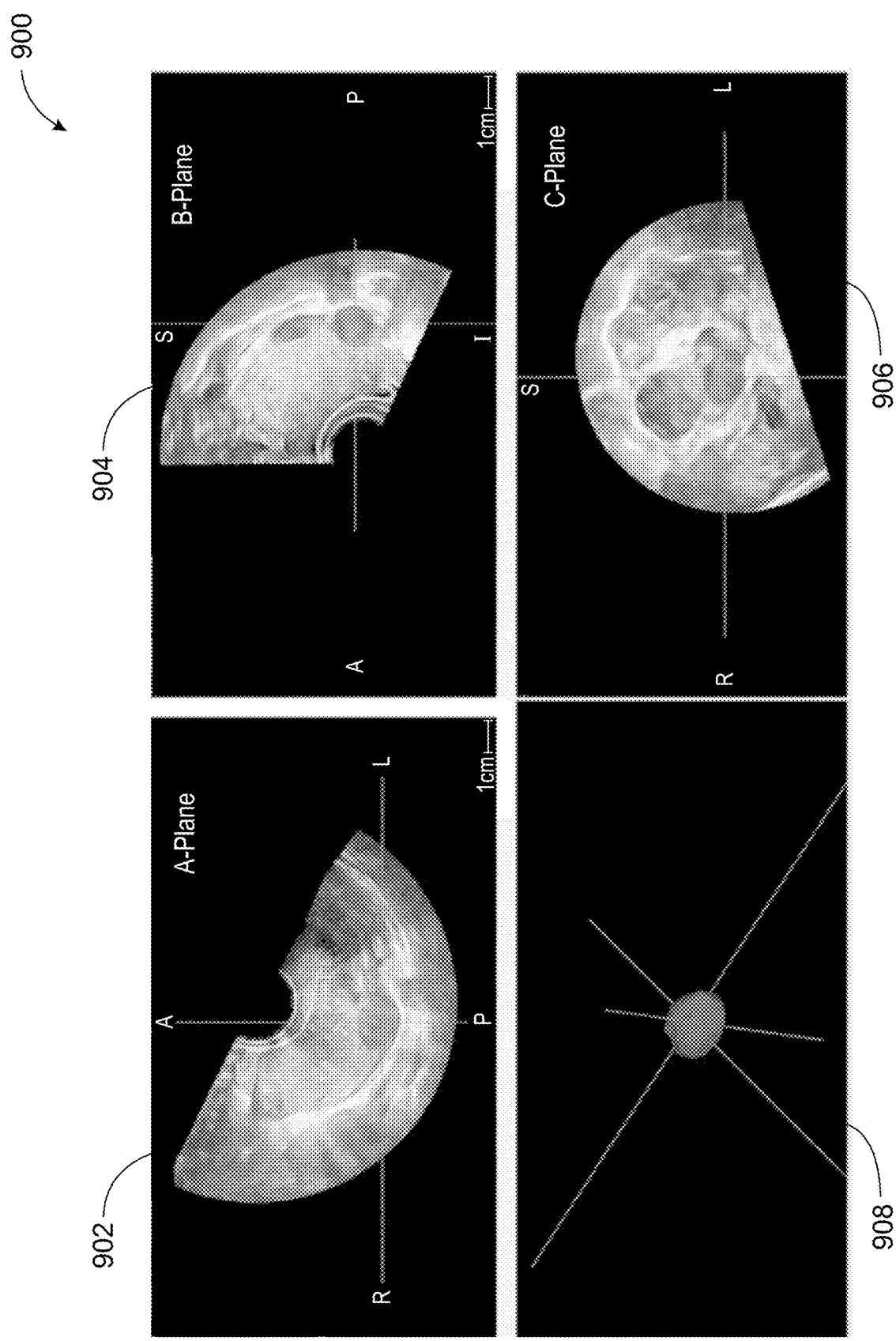
FIG. 9 is a screenshot in accordance with an exemplary embodiment.

FIG. 9 is a screenshot 900 in accordance with an exemplary embodiment. The screenshot 900 includes a first image 902 of an A-plane view, a second image 904 of a B-plane view, a third image 906 of a C-plane view, and a volume rendering 908. The volume-rendering 908 of the object is generated based on a three-dimensional shape model, such as the three-dimensional shape model 800. The first image 902, the second image 904, and the third image 906, show slices through the object 302 represented by the volume rendering 908.

The method described in association with FIG. 2 provides numerous advantages. The method 200 involves receiving identification of a seed point which was manually identified by a user. This makes for a more robust identification of seed points compared to techniques in which the seed points are determined automatically. The method 200 involves implementing a two-dimensional segmentation model on both a first plurality of parallel slices and a second plurality of parallel slices and then accumulating the first plurality of segmented regions with the second plurality of segmented regions in order to generate a detected region. The slices in which the two-dimensional segmentation model is implemented are close to the slice in which the seed point was identified in accordance with an embodiment. The method 200 also involves implementing a shape-completion model based on the detected region to generate a three-dimensional shape model for the object. This results in a technique that provides for a robust identification of the three-dimensional shape model, which is significantly faster than techniques that rely on either applying a two dimensional segmentation model on every slice or applying a three-dimensional segmentation model. Three-dimensional segmentation models are very computationally expensive, and are therefore not always a practical option with conventional ultrasound imaging systems. For example, conventional ultrasound imaging systems are oftentimes resource-constrained when processing full resolution volumes and do not have enough excess processing power to handle a conventional three-dimensional segmentation tasks while generating full-resolution volumes. Additionally, conventional three-dimensional segmentation models are typically not very accurate for performing fibroid segmentation or segmenting other objects with poorly defined boundaries/margins/contours. Likewise, applying a two dimensional segmentation model on every slice within the object would also take too much time based on the hardware that is available on contemporary ultrasound imaging systems.

According to an embodiment, the user may identify the seed point on the image that shows the object the most clearly. If the image is a rendering of a slice, the user may select the image where the object is the largest in width/diameter, as this should roughly correspond to the center of the object, assuming the object is generally round or oval in shape. The processor 116 may receive the identification of the seed point as a three-dimensional coordinate with respect to the volumetric dataset and/or the acquired volume represented by the volumetric dataset. Or, according to other embodiments, the processor 116 may convert the identification of the seed point received from the user interface 115 into a three-dimensional coordinate with respect to the volumetric dataset and/or the acquired volume represented by the volumetric dataset.

According to various embodiments where the object is a fibroid, the processor 116 may be configured to calculate an International Federation of Gynecology and Obstetrics (FIGO) classification label for each fibroid. The FIGO classification label is a standardized way to classify uterine fibroids. The FIGO classification system, which is used to apply FIGO classification labels, divides fibroids in submucosal, other (including intramural and subserosal), and hybrid types. The submucosal group includes type 0 and type 1, with type 1 fibroids including greater than 50% intramural and less than or equal to 50% submucosal. The type 2 fibroids includes less than or equal to 50% intramural and less than 50% submucosal. The "other" fibroids include types 3, 4, 5, 6, 7, and 8. Type 3 includes 100% intramural and contact the endometrium. Type 4 includes 100% intramural with no endometrial or subserosal contact. Type 5 includes fibroids that are subserosal and 50% or more intramural. The type 6 includes fibroids that are subserosal and less than 50% intramural. Type 7 includes pedunculated subserosal fibroids. Type 8 includes non-myometrial locations, such as cervical, broad ligament, or parasitic. The hybrid group is identified using a "X-X" designation, where the first number designates the submucosal component and the second number designates the subserosal component. According to various embodiments, the processor 116 may be configured to determine the appropriate FIGO classification label for each fibroid based on the characteristics/location of each fibroid. According to various embodiments, the processor 116 may be configured to display the FIGO classification label on the display device for each of fibroid.

Figure 10:
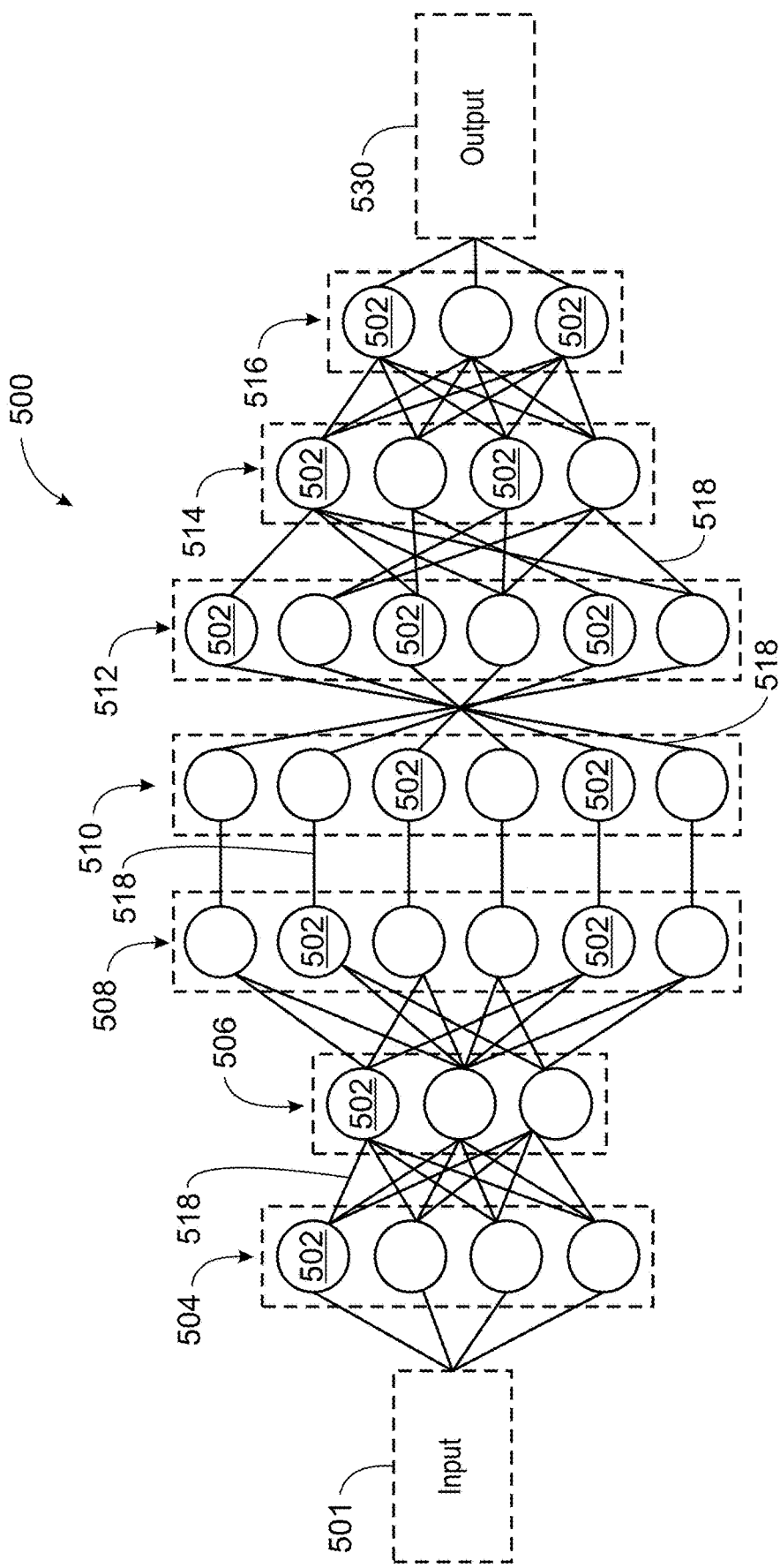
FIG. 10 is a schematic diagram of a neural network in accordance with an exemplary embodiment.
Figure 11:
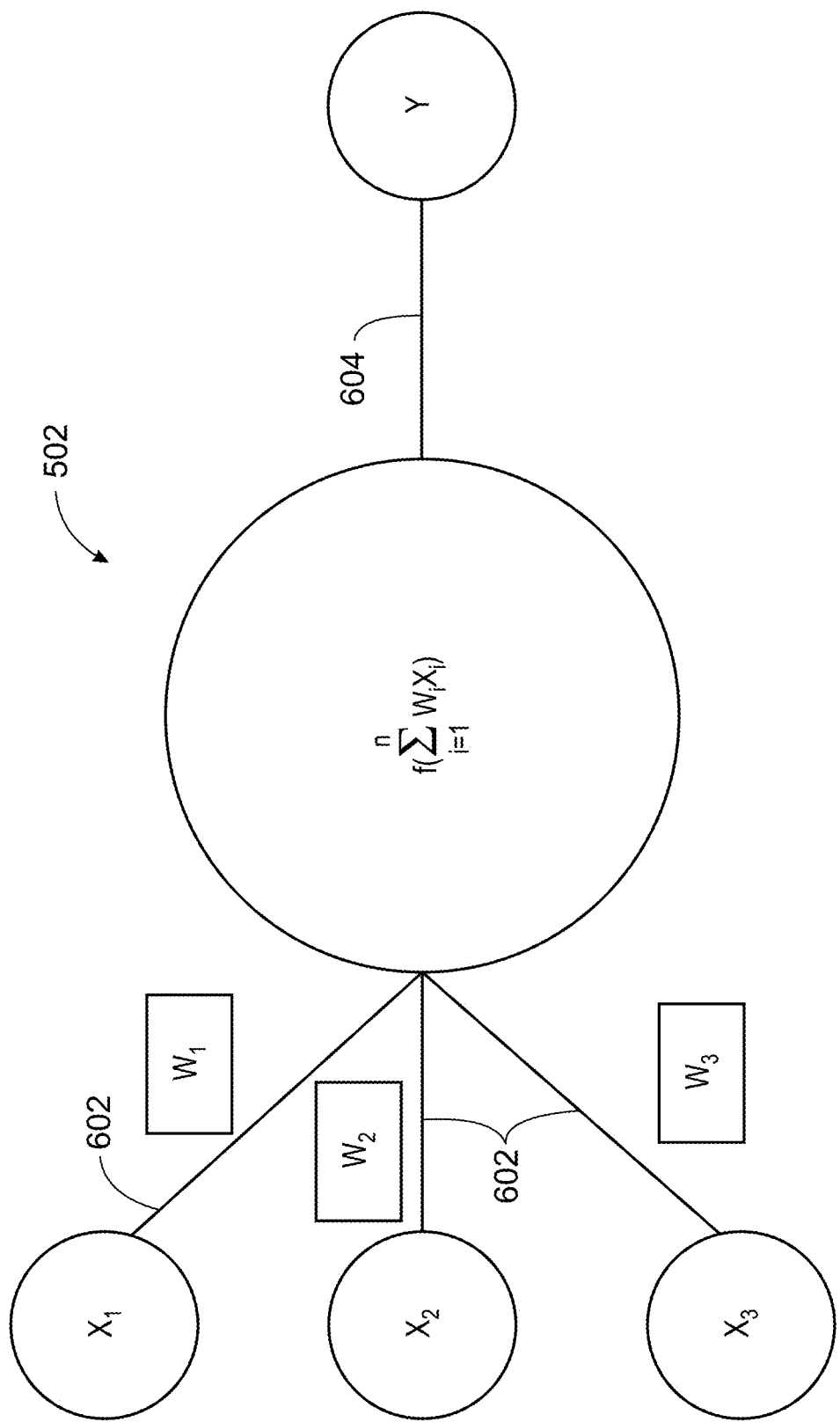
FIG. 11 is a schematic diagram showing input and output connections for a neuron in accordance with an exemplary embodiment.

Referring now to FIGS. 10 and 11, an exemplary neural network in accordance with an exemplary embodiment. A neural network, such as the neural network shown in FIGS. 10 and 11 may be used to perform step 212 and step 214 of the method 200. Additionally, a neural network such as the neural network shown in FIGS. 10 and 11 may be used to perform step 218 of the method 200. It should be appreciated that the neural network used to perform step 218 may be trained differently than the one or more neural networks used to perform steps 212 and 214.

FIG. 10 depicts a schematic diagram of a neural network 500 having one or more nodes/neurons 502 which, in some embodiments, may be disposed into one or more layers 504, 506, 508, 510, 512, 514, and 516. Neural network 500 may be a deep neural network. As used herein with respect to neurons, the term "layer" refers to a collection of simulated neurons that have inputs and/or outputs connected in similar fashion to other collections of simulated neurons. Accordingly, as shown in FIG. 10, neurons 502 may be connected to each other via one or more connections 518 such that data may propagate from an input layer 504, through one or more intermediate layers 506, 508, 510, 512, and 514, to an output layer 516.

FIG. 11 shows input and output connections for a neuron in accordance with an exemplary embodiment. As shown in FIG. 10, connections (e.g., 518) of an individual neuron 502 may include one or more input connections 602 and one or more output connections 604. Each input connection 602 of neuron 502 may be an output connection of a preceding neuron, and each output connection 604 of neuron 502 may be an input connection of one or more subsequent neurons. While FIG. 11 depicts neuron 502 as having a single output connection 604, it should be understood that neurons may have multiple output connections that send/transmit/pass the same value. In some embodiments, neurons 502 may be data constructs (e.g., structures, instantiated class objects, matrices, etc.), and input connections may be received by neuron 502 as weighted numerical values (e.g., floating point or integer values). For example, as further shown in FIG. 10, input connections X1, X2, and X3 may be weighted by weights W1, W2, and W3, respectively, summed, and sent/transmitted/passed as output connection Y. As will be appreciated, the processing of an individual neuron 502 may be represented generally by the equation:

$$Y = f\left(\sum_{i=1}^{n} W_i X_i\right)$$

where n is the total number of input connections 602 to neuron 502. In one embodiment, the value of Y may be based at least in part on whether the summation of WiXi exceeds a threshold. For example, Y may have a value of zero (0) if the summation of the weighted inputs fails to exceed a desired threshold.

As will be further understood from FIGS. 10 and 11, input connections 602 of neurons 502 in input layer 504 may be mapped to an input 501, while output connections 604 of neurons 502 in output layer 516 may be mapped to an output 530. As used herein, "mapping" a given input connection 602 to input 501 refers to the manner by which input 501 affects/dictates the value said input connection 602. Similarly, as also used herein, "mapping" a given output connection 604 to output 530 refers to the manner by which the value of said output connection 604 affects/dictates output 530.

Accordingly, in some embodiments, the acquired/obtained input 501 is passed/fed to input layer 504 of neural network 500 and propagated through layers 504, 506, 508, 510, 512, 514, and 516 such that the mapped output connections 604 of output layer 516 generate/correspond to output 530.

Neural network 500 may be trained using a plurality of training datasets. The training datasets may, for instance, include a plurality of annotated images. The machine learning, or deep learning, therein to change, input/output connections to change, or other adjustments to neural network 500. Further, as additional training datasets are employed, the machine learning may continue to adjust various parameters of the neural network 500 in response.

In an embodiment, a method of ultrasound imaging includes accessing a volumetric ultrasound dataset. The method includes generating an image based on the volumetric ultrasound dataset. The method includes identifying a seed point for an object based on the image. The method includes automatically implementing a two-dimensional segmentation model on a first plurality of parallel slices based on the seed point to generate a first plurality of segmented regions, wherein the first plurality of parallel slices are generated based on the volumetric ultrasound dataset. The method includes automatically implementing the two-dimensional segmentation model on a second plurality of parallel slices based on the seed point to generate a second plurality of segmented regions, wherein second plurality of slices are generated based on the volumetric ultrasound dataset, and wherein the second plurality of parallel slices is not parallel to the first plurality of parallel slices. The method includes automatically generating a detected region by accumulating the first plurality of segmented regions and the second plurality of segmented regions, wherein the detected region represents less than all of the object. The method includes automatically implementing a shape completion model on the detected region in order to generate a three-dimensional shape model for the object. The method includes generating a rendering of the object based on the three-dimensional shape model and displaying the rendering of the object on a display device.

In an embodiment, implementing the shape completion model includes implementing a trained deep learning model.

In an embodiment, the first plurality of parallel slices is one of a plurality of A-plane slices or a plurality of B-plane slices and the second plurality of parallel slices is the other of the plurality of A-plane slices or the plurality of B-plane slices.

In an embodiment, identifying the seed point is performed manually via an input through a user interface.

In an embodiment, generating the detected region further comprises applying a smoothing function to the first plurality of segmented regions and the second plurality of segmented regions.

In an embodiment, the method further includes resizing the detected region to a smaller size prior to said implementing the shape completion model, and wherein said implementing the shape completion model comprises implementing a trained deep learning model.

In an embodiment, the method further includes displaying a rendering of the detected region on the display device before said implementing a shape completion model.

In an embodiment, the object is a fibroid.

In an embodiment, displaying the rendering of the object on the display device comprises displaying a rendering of the fibroid along with a rendering of a uterus and a rendering of an endometrium, wherein the rending of the uterus and the rendering of the endometrium are both generated from the volumetric ultrasound dataset.

In an embodiment, the object is a fibroid and the method further includes automatically calculating a FIGO classification label and displaying the FIGO classification label on the display device.

In an embodiment, an ultrasound imaging system includes an ultrasound probe, a user interface, a display device, and a processor in electronic communication with the ultrasound probe, the user interface and the display device. The processor is configured to access a volumetric ultrasound dataset and generate an image based on the volumetric ultrasound dataset. The processor is configured to either receive an identification of a seed point or identify a seed point, wherein the seed point is for an object based on the image. The processor is configured to automatically implement a two-dimensional segmentation model on a first plurality of parallel slices based on the seed point to generate a first plurality of segmented regions, wherein the first plurality of parallel slices are generated based on the volumetric ultrasound dataset. The processor is configured to automatically implement the two-dimensional segmentation model on a second plurality of parallel slices based on the seed point to generate a second plurality of segmented regions, wherein the second plurality of parallel slices are generated based on the volumetric ultrasound dataset, and wherein the second plurality of parallel slices is not parallel to the first plurality of parallel slices. The processor is configured to automatically implement a shape completion model on the detected region in order to generate a three-dimensional shape model for the object. The processor is configured to generate a rendering of the object based on the three-dimensional shape model. The processor is configured to display the rendering of the object on the display device.

In an embodiment, the processor is configured to implement the shape completion model by implementing a trained deep learning model.

In an embodiment, the first plurality of parallel slices is one of a plurality of A-plane slices or a plurality of B-plane slice and the second plurality of parallel slices is the other of the plurality of A-plane slices or the plurality of B-plane slices.

In an embodiment, the processor is configured to receive an identification of the seed point via an input through the user interface.

In an embodiment, the processor is configured to generate the detected region by applying a smoothing function to the first plurality of segmented regions and the second plurality of segmented regions.

In an embodiment, the processor is further configured to resize the detected region to a smaller size prior to implementing the shape completion model, and wherein the shape completion model is a trained deep learning model.

In an embodiment, the processor is further configured to display a rendering of the detected region on the display device before implementing the shape completion model. In an embodiment, the object is a fibroid.

In an embodiment, processor is configured to display the rendering of the object by displaying a rendering of the fibroid, and the processor is further configured to display a rendering of a uterus and a rendering of an endometrium on the display device with the rendering of the fibroid.

In an embodiment, the object is a fibroid and the processor is configured to automatically calculate a FIGO classification label and display the FIGO classification label on the display device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method of ultrasound imaging comprising:
   accessing a volumetric ultrasound dataset;
   generating an image based on the volumetric ultrasound dataset;
   receiving an identification of a seed point for an object based on the image;
   automatically implementing a two-dimensional segmentation model on a first plurality of parallel slices based on the seed point to generate a first plurality of segmented regions, wherein the first plurality of parallel slices is generated based on the volumetric ultrasound dataset;
   automatically implementing the two-dimensional segmentation model on a second plurality of parallel slices based on the seed point to generate a second plurality of segmented regions, wherein second plurality of slices is generated based on the volumetric ultrasound dataset, and wherein the second plurality of parallel slices is not parallel to the first plurality of parallel slices;
   automatically generating a detected region by accumulating the first plurality of segmented regions and the second plurality of segmented regions, wherein the detected region represents less than all of the object;
   automatically implementing a shape completion model on the detected region in order to generate a three-dimensional shape model for the object;
   generating a rendering of the object based on the three-dimensional shape model; and
   displaying the rendering of the object on a display device.

2. The method of claim 1, wherein said implementing the shape completion model comprises implementing a trained deep learning model.

3. The method of claim 1, wherein the first plurality of parallel slices is one of plurality of A-plane slices or a plurality of B-plane slices and the second plurality of parallel slices is the other of the plurality of A-plane slices or the plurality of B-plane slices.

4. The method of claim 1, wherein said identifying the seed point is performed manually via an input through a user interface.

5. The method of claim 1, wherein said generating the detected region further comprises applying a smoothing function to the first plurality of segmented regions and the second plurality of segmented regions.

6. The method of claim 1, further comprising resizing the detected region to a smaller size prior to said implementing the shape completion model, and wherein said implementing the shape completion model comprises implementing a trained deep learning model.

7. The method of claim 1, further comprising displaying a rendering of the detected region on the display device before said implementing a shape completion model.

8. The method of claim 1, wherein the object is a fibroid.

9. The method of claim 8, wherein said displaying the rendering of the object on the display device comprises displaying a rendering of the fibroid along with a rendering of a uterus and a rendering of an endometrium, wherein the rending of the uterus and the rendering of the endometrium are both generated from the volumetric ultrasound dataset.

10. The method of claim 1, wherein the object is a fibroid and wherein the method further comprises:
    automatically calculating an International Federation of Gynecology and Obstetrics (FIGO) classification label for the fibroid; and
    displaying the FIGO classification label on the display device.

11. An ultrasound imaging system comprising:
    an ultrasound probe;
    a user interface;
    a display device; and
    a processor in electronic communication with the ultrasound probe, the user interface and the display device, wherein the processor is configured to:
    access a volumetric ultrasound dataset;
    generate an image based on the volumetric ultrasound dataset;
    either receive an identification of a seed point or identify a seed point, wherein the seed point is for an object based on the image;
    automatically implement a two-dimensional segmentation model on a first plurality of parallel slices based on the seed point to generate a first plurality of segmented regions, wherein the first plurality of parallel slices is generated based on the volumetric ultrasound dataset;
    automatically implement the two-dimensional segmentation model on a second plurality of parallel slices based on the seed point to generate a second plurality of segmented regions, wherein the second plurality of parallel slices is generated based on the volumetric ultrasound dataset, and wherein the second plurality of parallel slices is not parallel to the first plurality of parallel slices;
    automatically implement a shape completion model on a detected region in order to generate a three-dimensional shape model for the object;
    generate a rendering of the object based on the three-dimensional shape model; and
    display the rendering of the object on the display device.

12. The ultrasound imaging system of claim 11, wherein the processor is configured to implement the shape completion model by implementing a trained deep learning model.

13. The ultrasound imaging system of claim 11, wherein the first plurality of parallel slices is one of a plurality of A-plane slices or a plurality of B-plane slice and the second plurality of parallel slices are the other of the plurality of A-plane slices or the plurality of B-plane slices.

14. The ultrasound imaging system of claim 11, wherein the processor is configured to receive an identification of the seed point via an input through the user interface.

15. The ultrasound imaging system of claim 11, wherein the processor is configured to generate the detected region by applying a smoothing function to the first plurality of segmented regions and the second plurality of segmented regions.

16. The ultrasound imaging system of claim 11, wherein the processor is further configured to resize the detected region to a smaller size prior to implementing the shape completion model, and wherein the shape completion model is a trained deep learning model.

17. The ultrasound imaging system of claim 11, further comprising displaying a rendering of the detected region on the display device before said implementing a shape completion model.

18. The ultrasound imaging system of claim 11, wherein the object is a fibroid.

19. The ultrasound imaging system of claim 18, wherein the processor is configured to display the rendering of the object by displaying a rendering of the fibroid, and wherein the processor is further configured to display a rendering of a uterus and a rendering of an endometrium on the display device with the rendering of the fibroid.

20. The ultrasound imaging system of claim 11, wherein the object is a fibroid, and wherein the processor is further configured to:
- automatically calculate an International Federation of Gynecology and Obstetrics (FIGO) classification label for the fibroid; and
- display the FIGO classification label on the display device.

\* \* \* \* \*